United States Patent [19]

Chang

[11] Patent Number: 5,749,477
[45] Date of Patent: May 12, 1998

[54] VIDEO/AUDIO MEDIUM RACK

[76] Inventor: I-Chen Chang, 2F, No. 41, Man-Ping St., Pan-Ch'iao City, Taipei Hsien, Taiwan

[21] Appl. No.: 718,237

[22] Filed: Sep. 20, 1996

[51] Int. Cl.$^6$ .................. A47G 29/00; A47B 81/06
[52] U.S. Cl. .................. 211/40; 211/41.12; 211/163; D6/407; 312/9.48; 312/9.1; 312/350; 206/309
[58] Field of Search .................. 211/41.1, 40, 41.12, 211/163, 194; 312/9.48, 9.51, 351, 350, 9.1, 9.46; D6/407, 626, 628, 630; 206/309, 387

[56] References Cited

U.S. PATENT DOCUMENTS

| D. 320,707 | 10/1991 | Garfinkle | D6/407 |
| D. 360,099 | 7/1995 | Wu | D6/407 X |
| 4,889,244 | 12/1989 | Hehn et al. | 211/40 X |
| 5,393,135 | 2/1995 | Tisbo et al. | 312/9.48 |
| 5,524,976 | 6/1996 | Peng | 211/40 X |
| 5,593,046 | 1/1997 | Katsuura et al. | 312/350 X |

*Primary Examiner*—Peter M. Cuomo
*Assistant Examiner*—James O. Hansen
*Attorney, Agent, or Firm*—Bacon & Thomas

[57] ABSTRACT

A video/audio medium rack at least including four connecting rods, four wall boards and a back board. The wall boards are disposed with tenons interlacedly engaged with engaging slots of the connecting rods so as to assemble the wall boards with the connecting rods. The back board is formed with peripheral stopper edge for fitting into channels of the wall boards so as to assemble the back board with the wall boards. CDs and VHS tapes can be both rested in the rack. Several racks can be stacked or assembled to enlarge the capacity of the rack. A base is disposed under the bottom of the rack and rotatably fitted with a bottom dish, whereby the base together with the rack can be rotated relative to the bottom dish.

7 Claims, 10 Drawing Sheets

VIDEO/AUDIO MEDIUM RACK

BACKGROUND OF THE INVENTION

The present invention relates to a video/audio medium rack at least including four connecting rods on the corners, permitting several racks to be easily assembled into various types of units in all directions so as to enlarge the capacity of the rack. The components of the rack can be easily manufactured and directly packed with a bag without any assembling procedure in the factory. CDs and VHS tapes can be both rested in the rack.

Various kinds of racks for video/audio media are commercially available. Such products can be substantially divided into two aspects one of which is a fixed pattern, while the other of which is a knockdown pattern.

With respect to both the fixed and knockdown patterns, the racks always have constant capacity which cannot be expanded. Also, the components of these racks are complicated so that it is time-consuming and laborious to manufacture and assemble these components prior to sale. In addition, the conventional rack structure can only receive one single type of video/audio media so that the usage of the rack is limited.

Some of the existing video/audio medium racks are additionally disposed with connecting means for simply monotonously stacking several identical products into a unit with enlarged capacity. However, each enlarged capacity of such products is still fixed and cannot be varied as necessary. Therefore, such products are only applicable to limited sites.

SUMMARY OF THE INVENTION

It is therefore a primary object of the present invention to provide a video/audio medium rack including simple components which can be easily manufactured by injection molding and directly packed with a bag for sale without any assembling procedure in the factory. Four connecting rods on the corners of the rack permit several racks to be easily assembled into various types of units in all directions so as to enlarge the capacity of the rack. CDs and VHS tapes can be both rested in the same chamber of the rack.

According to the above object, the video/audio medium rack of the present invention at least includes four connecting rods, four wall boards and a back board. Each connecting rod is a cylindrical body composed of two identical hollow semicylindrical members and two cap members. An inner side of the semicylindrical member is formed with an arch concave having a central engaging slot. An inner edge of the engaging slot is formed with a right angle plane face. Two lateral edges of the semicylindrical member are formed with recesses each of which together with the arch concave define another right angle plane face. Each end of the semicylindrical member is formed with an annular projection. Four knot sections are disposed on the inner side of the semicylindrical member at equal intervals. Two of the four knot sections adjacent to one end are disposed with tenons, while the other two knot sections adjacent to the other end are disposed with mortises. Two middle knot sections are disposed with hook bodies directed to the same direction. When the two semicylindrical members are assembled, the hook bodies are hooked with each other and the tenons and engaged with the mortises and the recesses together form another engaging slot. The cap members are tightly fitted with the annular projections to form the connecting rod with upper, lower, left and right engaging slots.

The wall boards are rectangular or square board bodies. Each lateral side of the wall board is disposed with multiple tenons having engaging blocks on two sides for passing through and engaging with the engaging slot. A rear side of the wall board is disposed with a channel for the back board to insert therein. The wall board is disposed with multiple slide rails perpendicular to the channel. Multiple arch guiding ribs are are disposed across the slide rails parallel to the channel. The back board is a rectangular or square plate body formed with peripheral stopper flange for fitting into the channels of the wall boards, whereby the tenons of the rectangular wall boards and square wall boards are interlacedly engaged in the engaging slots of the four connecting rods.

When it is desired to enlarge the capacity of the rack, the type and number of the wall boards and connecting rods can be determined according to the requirement and then several racks can be assembled into different patterns of video/audio medium cabinets as integral units. The aspect of the enlarged unit can be varied with the pattern of the application site.

The components of the video/audio medium rack can be assembled by a consumer himself/herself. CDs and VHS tapes can be both received in the rack. Therefore, the present invention can be more elastically and widely used. Also, in the manufacturing procedure, the assembling step is saved so that the cost is reduced.

The present invention can be best understood through the following description and accompanying drawing, wherein:

DETAILED DESCRIPTION OF THE PREFERRED EMBODIMENTS

Figure 1:
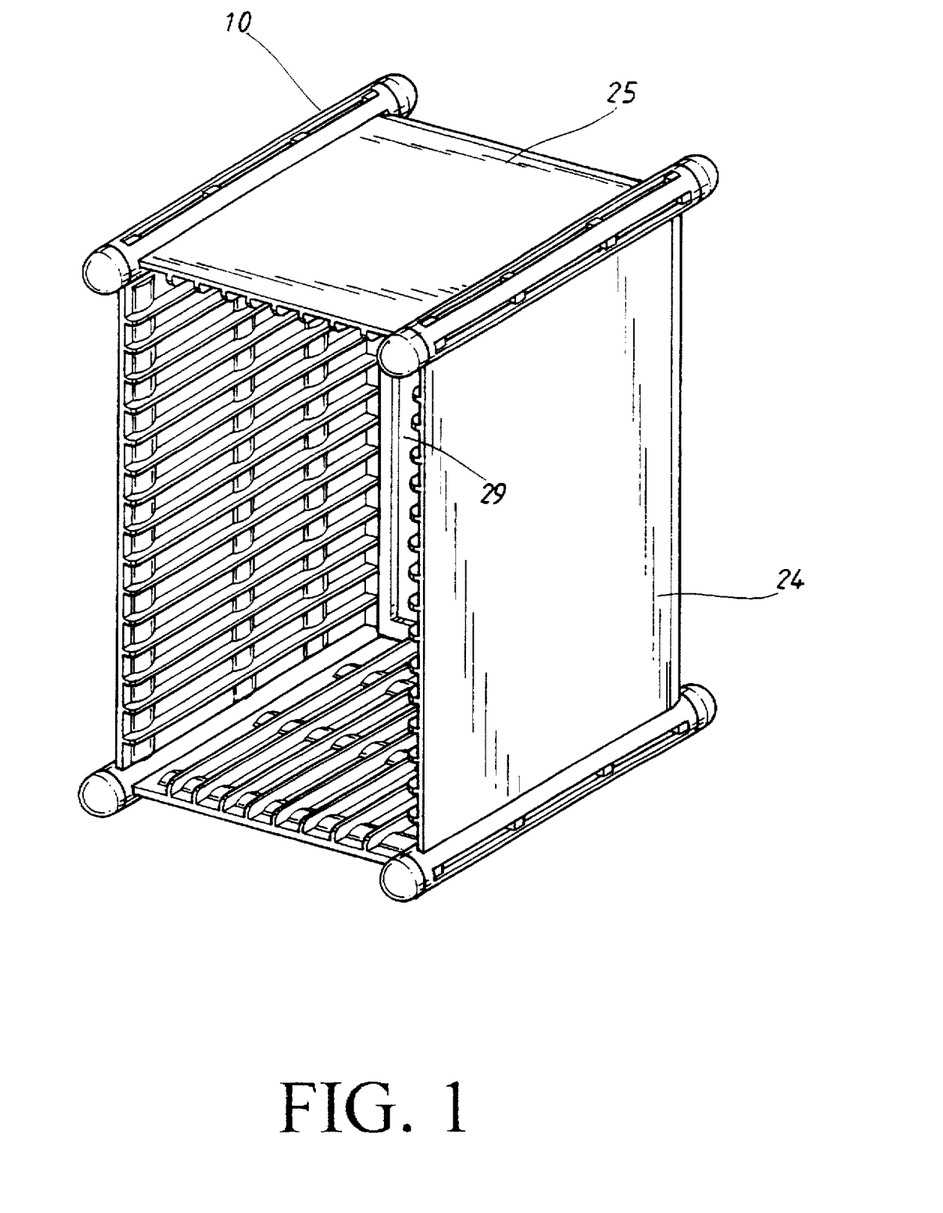
FIG. 1 is a perspective assembled view of the present invention.

Please refer to FIG. 1 which shows a preferred embodiment of the present invention, including four connecting rods 10, four wall boards 24, 25 and a back board 29.

Figure 2:
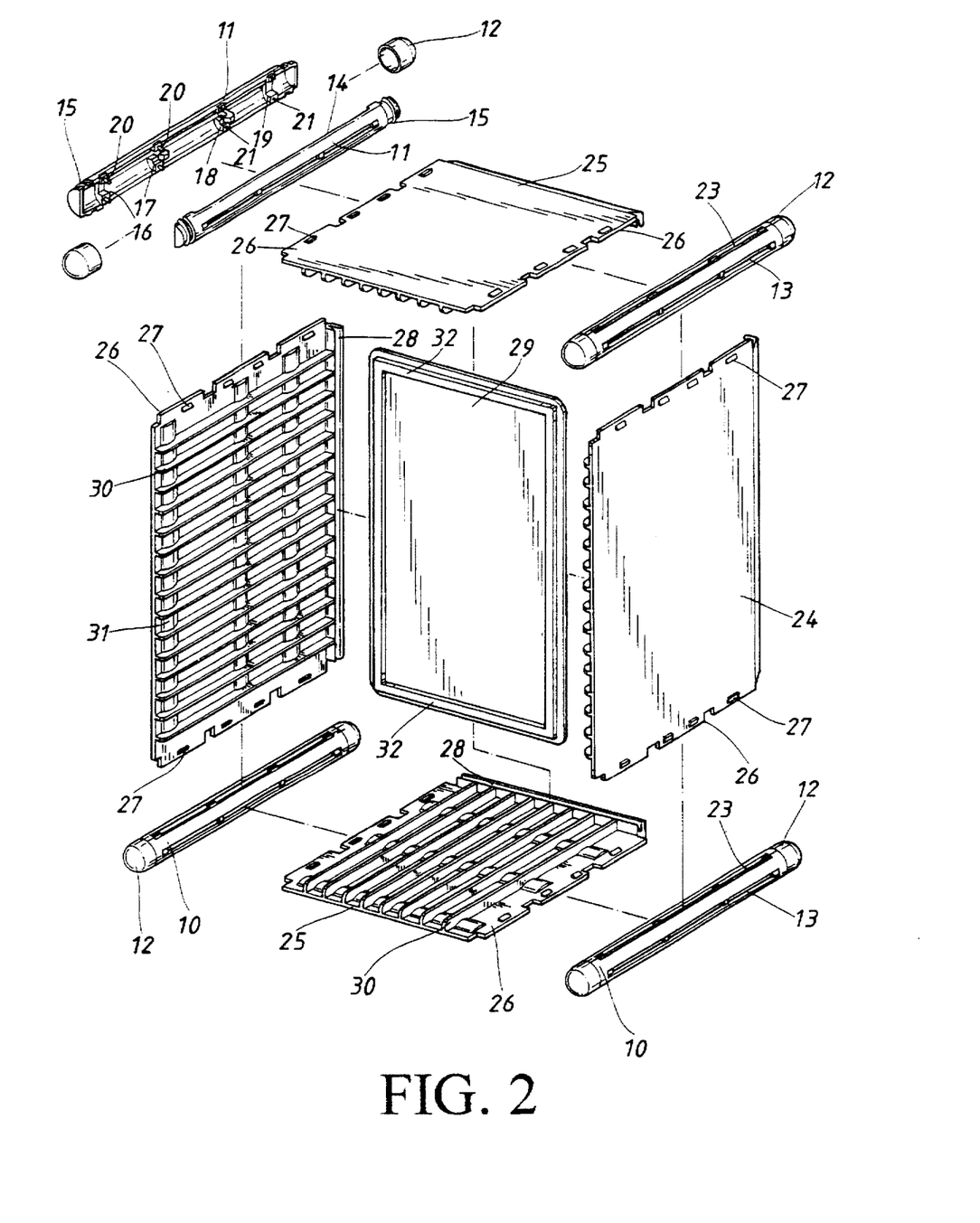
FIG. 2 is a perspective exploded view of the present invention.
Figure 3:
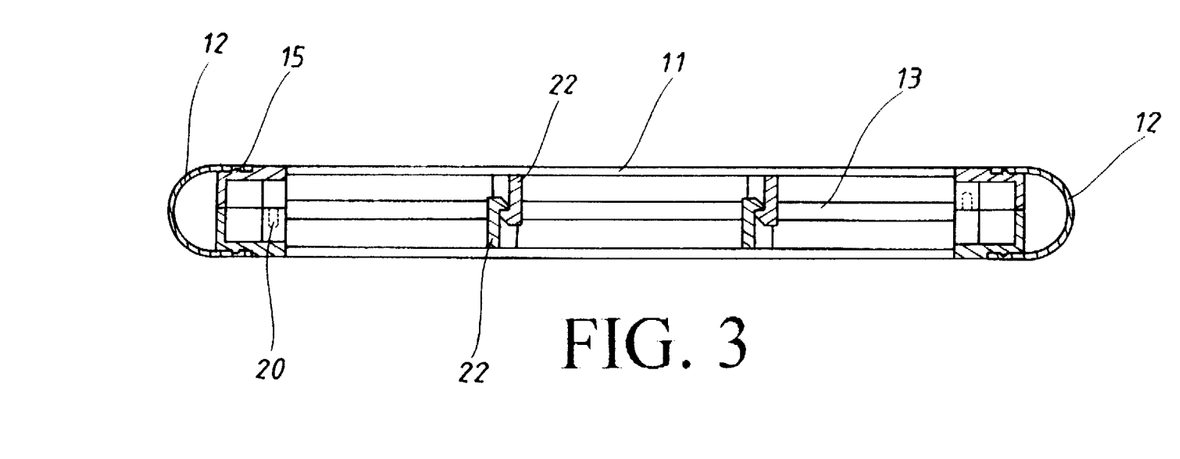
FIG. 3 is a longitudinal sectional view of the connecting rod of the present invention.
Figure 3A:
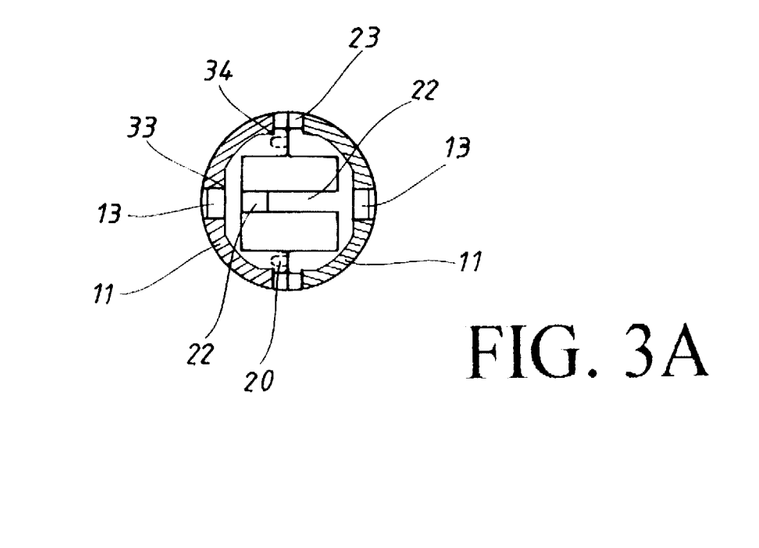
FIG. 3A is a cross-sectional view of the connecting rod of the present invention.

Please refer to FIGS. 2 and 3. The connecting rod 10 is a cylindrical body composed of two identical hollow semicylindrical members 11 and two cap members 12. The inner side of the semicylindrical member 11 is formed with an arch concave having a central engaging slot 13. The inner edge of the engaging slot 13 is formed with a right angle plane face 33 as shown in FIG. 3A. Two lateral edges of the semicylindrical member are formed with recesses 14 each of which together with the arch concave define a right angle plane face 34 as shown in FIG. 3A. Each end of the semicylindrical member is formed with an annular projection 15. Four knot sections 16, 17, 18, 19 are disposed on the inner side of the semicylindrical member at equal intervals. Two of the four knot sections 16, 17 adjacent to one end are disposed with tenons 20, while the other two knot sections 18, 19 adjacent to the other end are disposed with mortises 21. In addition, the two middle knot sections 17, 18 are disposed with hook bodies 22 directed to the same direction. When the two semicylindrical members 11 are assembled, the hook bodies 22 are hooked with each other and the tenons 20 and engaged with the mortises 21. At this time, the recesses 14 together form another engaging slot 23. The cap member 12 is tightly fitted with the annular projection 15 to form the connecting rod 10 with upper, lower, left and right engaging slots as shown in FIG. 3A.

The wall boards include left and right rectangular wall boards 24 and upper and lower square wall boards 25. Each lateral side of the wall board is disposed with multiple tenons 26 having an engaging block 27 for passing through and engaging with the engaging slot 13. The rear side of the wall board is disposed with a channel 28 for the back board 29 to insert therein. In addition, the wall board is disposed with multiple slide rails 30 perpendicular to the channel 28. The slide rails 30 can be disposed on single side or double sides as necessary. Moreover, multiple arch guiding ribs 31 are disposed across the slide rails 30 parallel to the channel 28 so as to reduce the frictional force between the video/ audio medium disks the wall boards and smoothen the pushing of the medium disk along the slide rail 30. The back board 29 can be a rectangular or square plate body formed with peripheral stopper flange 32 for fitting into the channels 28 of the wall boards. The tenons 26 of the rectangular wall boards 24 and square wall boards 25 are interlacedly engaged in the engaging slots 13 of the four connecting rods 10.

Figure 4:
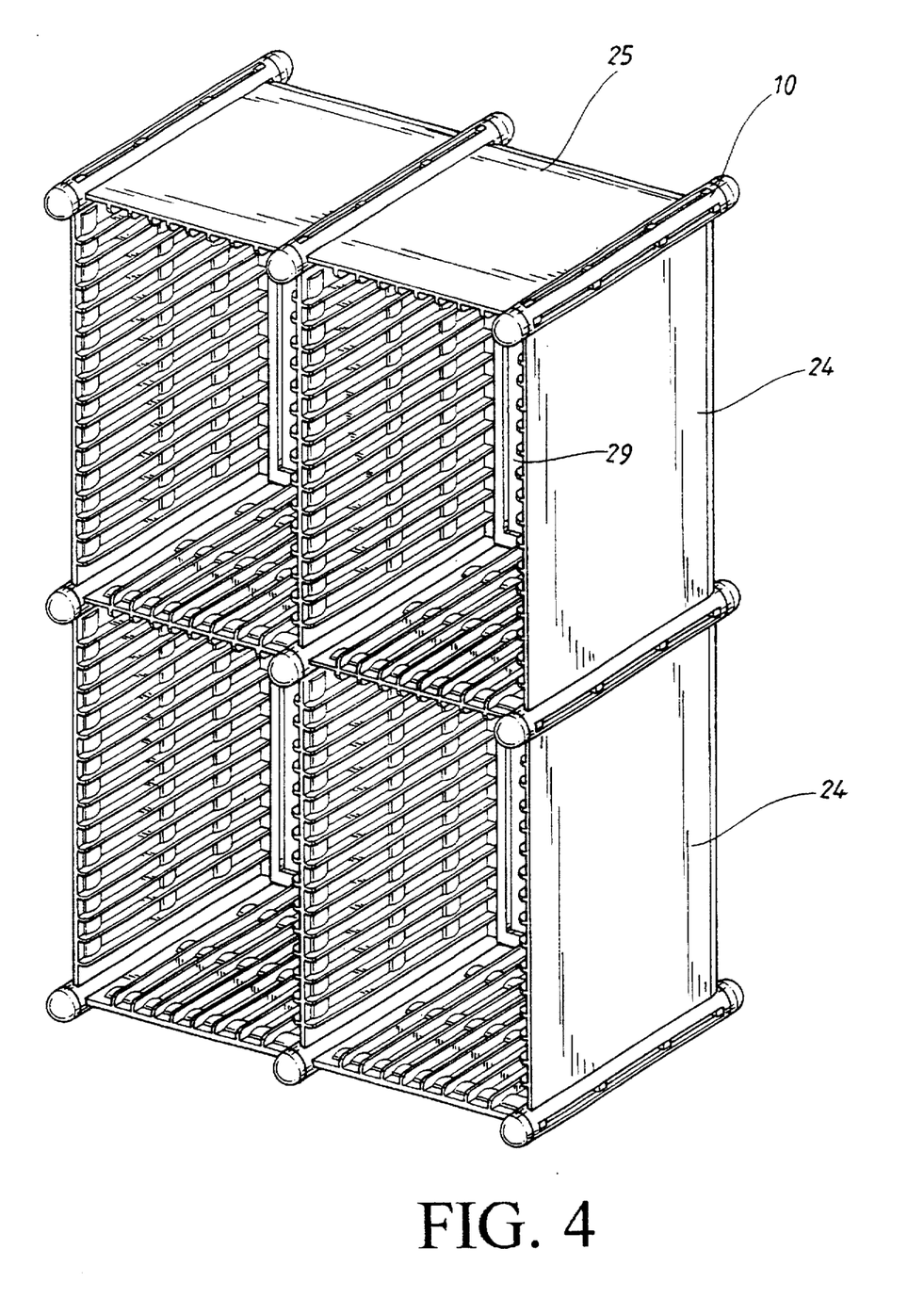
FIG. 4 shows an aspect of assembly formed by four racks of the present invention.
Figure 5:
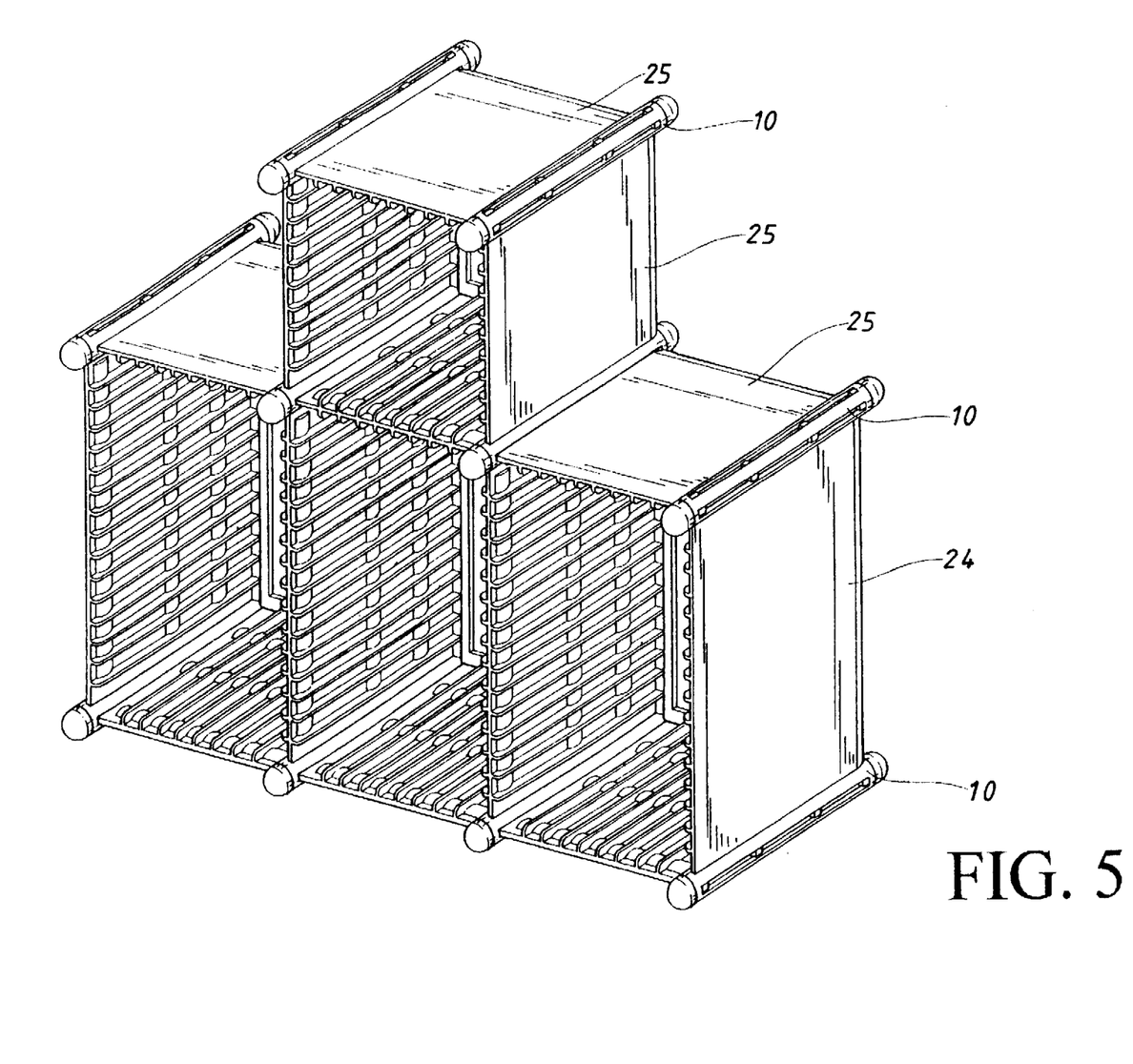
FIG. 5 shows another aspect of assembly formed by four racks of the present invention.

FIGS. 4 and 5 show the assembly of the present invention. By means of the wall boards 24, 25 with single side or double side slide rails 30 and the back boards 29, several racks can be assembled into different patterns of video/audio medium cabinets by connecting rods 10. In FIG. 4, CDs can be inserted into the cabinet horizontally or VHS tapes can be inserted into the cabinet vertically. In FIG. 5, CDs can be inserted into the upper square chamber horizontally or vertically.

Figure 6:
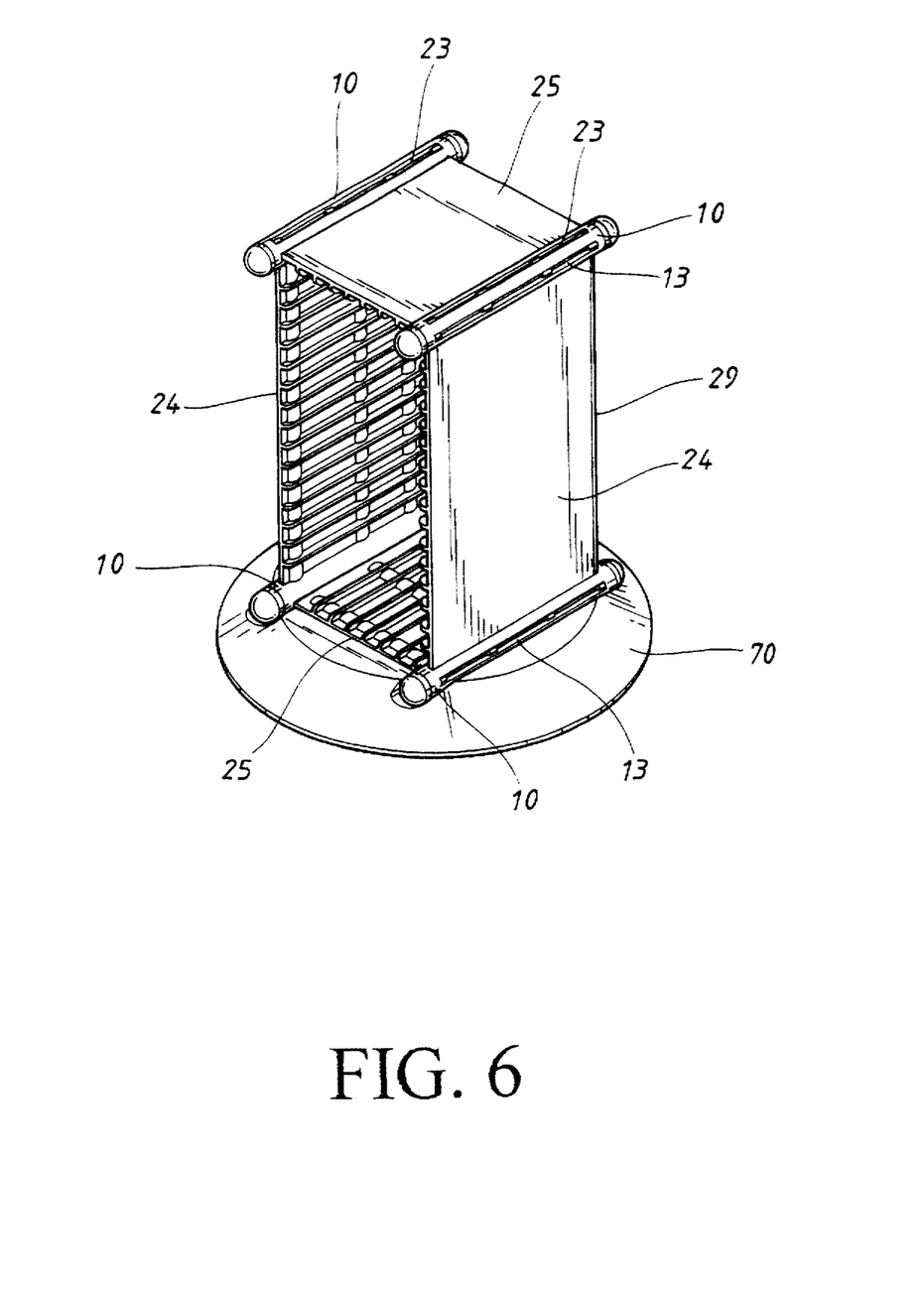
FIG. 6 is a perspective assembled view of another embodiment of the present invention.
Figure 7:
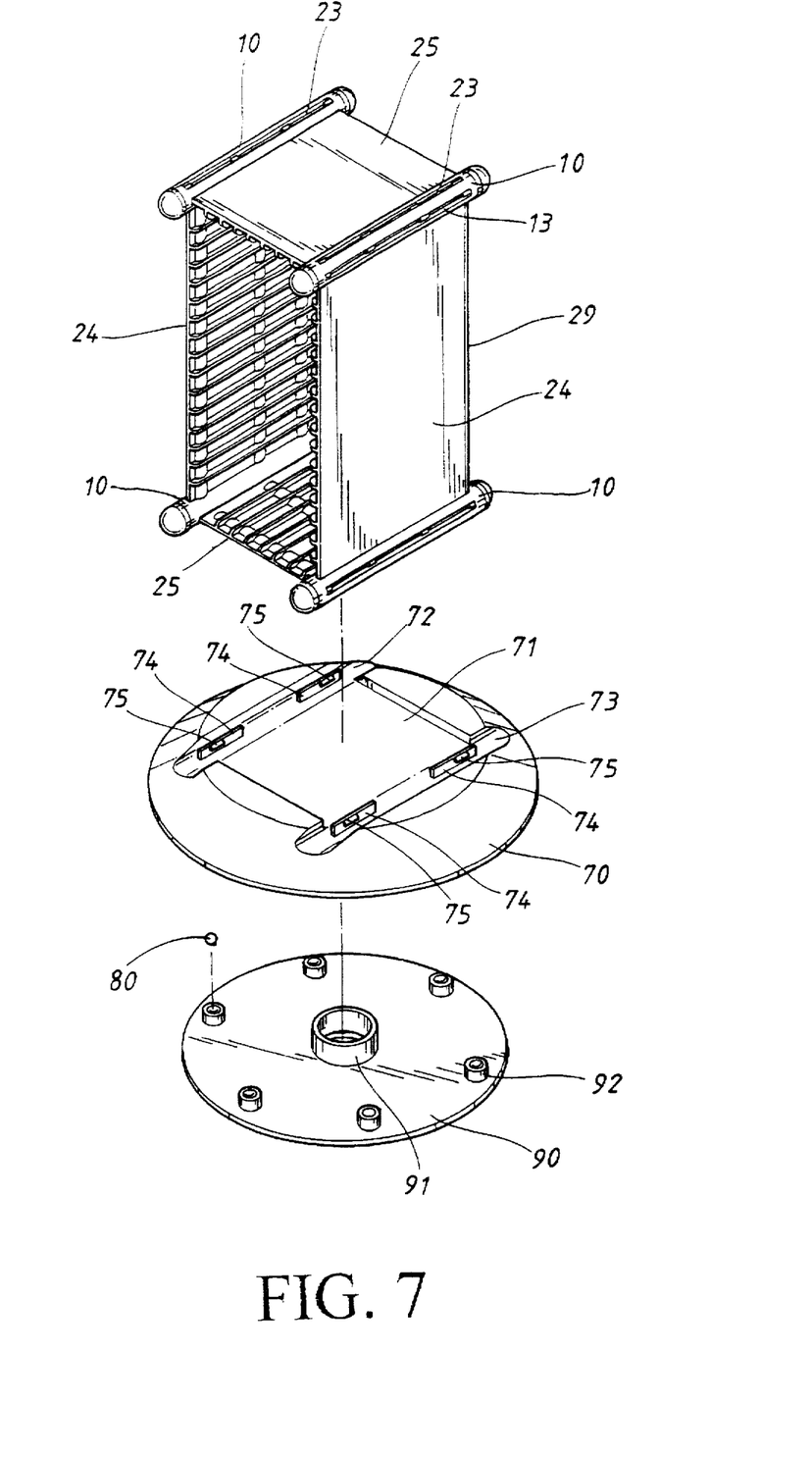
FIG. 7 is a perspective exploded view of the embodiment of FIG. 6.
Figure 8:
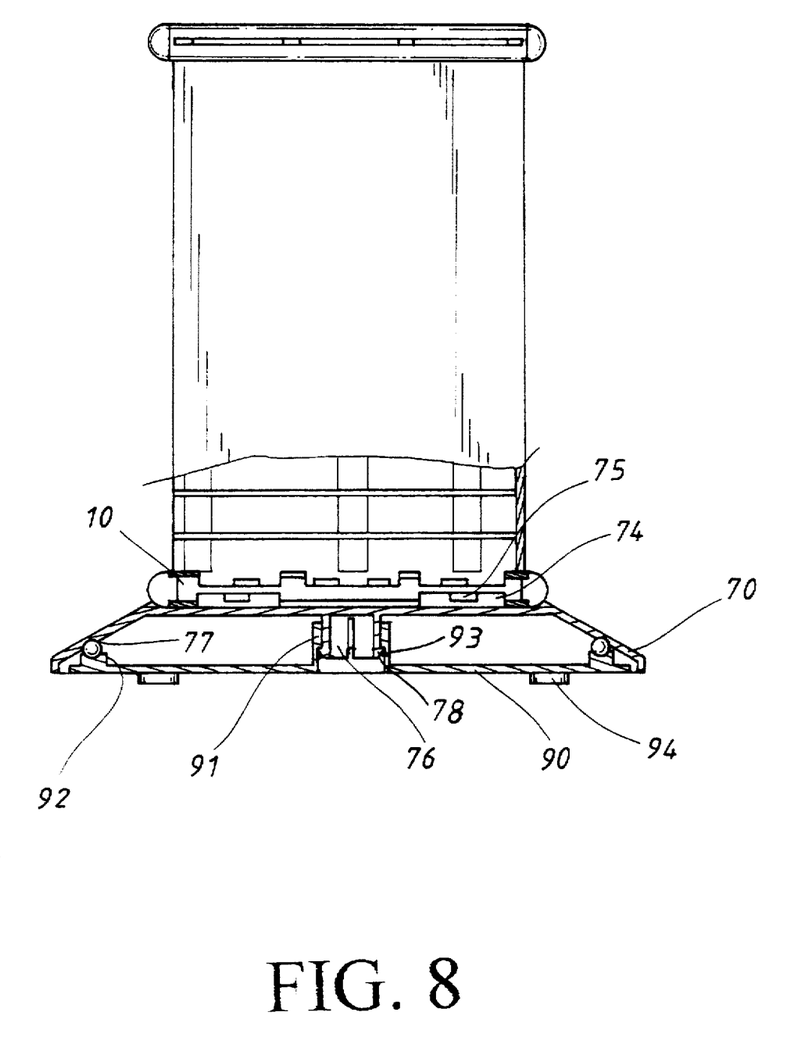
FIG. 8 is a sectional view according to FIG. 6.

FIGS. 6 to 8 show another embodiment of the present invention, in which a base 70 is added under the bottom of the rack. The base 70 can be fitted with a bottom dish 90 for placing the rack thereon.

The surface of the base 70 is formed with a dented face 71 corresponding to the bottom of the rack, which includes a lower wall board 25 and two lateral connecting rods 10. The dented face 71 includes a central dented section and two lateral rod-like arch dented sections 72, 73. Insertion plates 74 are disposed in the arch dented sections 72, 73. Each insertion plate 74 has two engaging blocks 75 on two sides.

When the rack is placed on the upper surface of the base 70, the insertion plates 74 of the arch dented sections 72, 73 are engaged with the engaging slots 23 of the lateral connecting rods 10 so that the rack can be assembled with the base 70.

Figure 9:
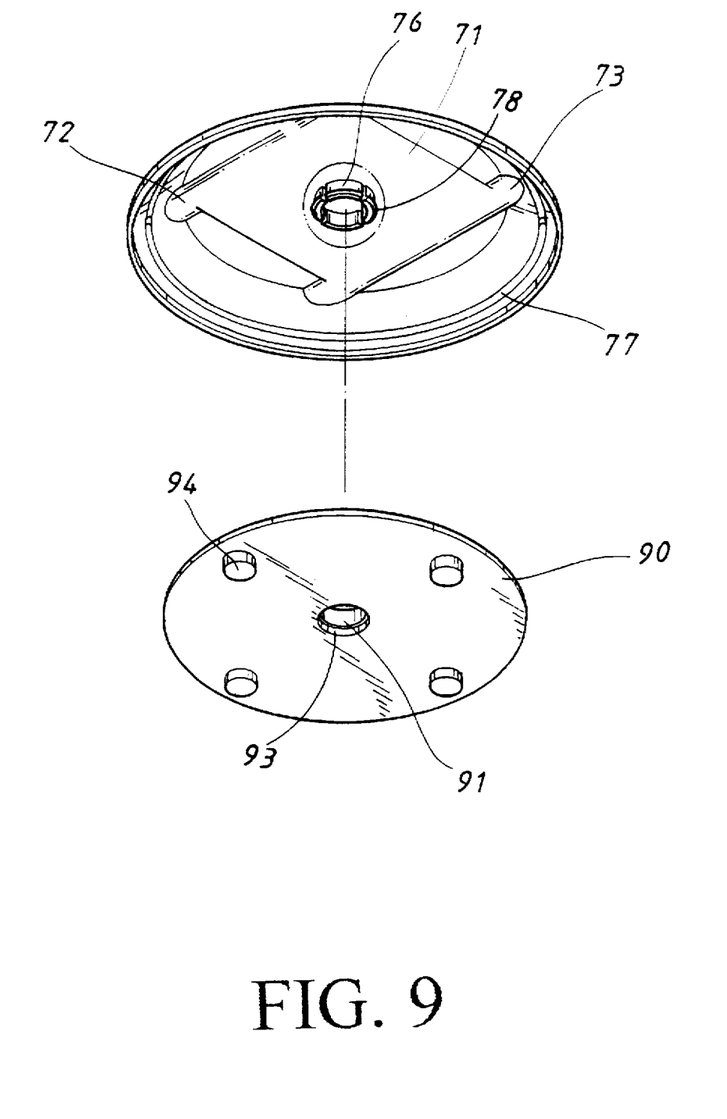
FIG. 9 is a bottom exploded view of the base and bottom dish of the embodiment of FIG. 6.
Figure 9A:
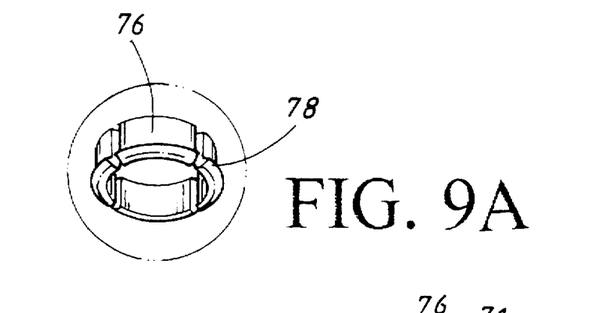
Figure 10:
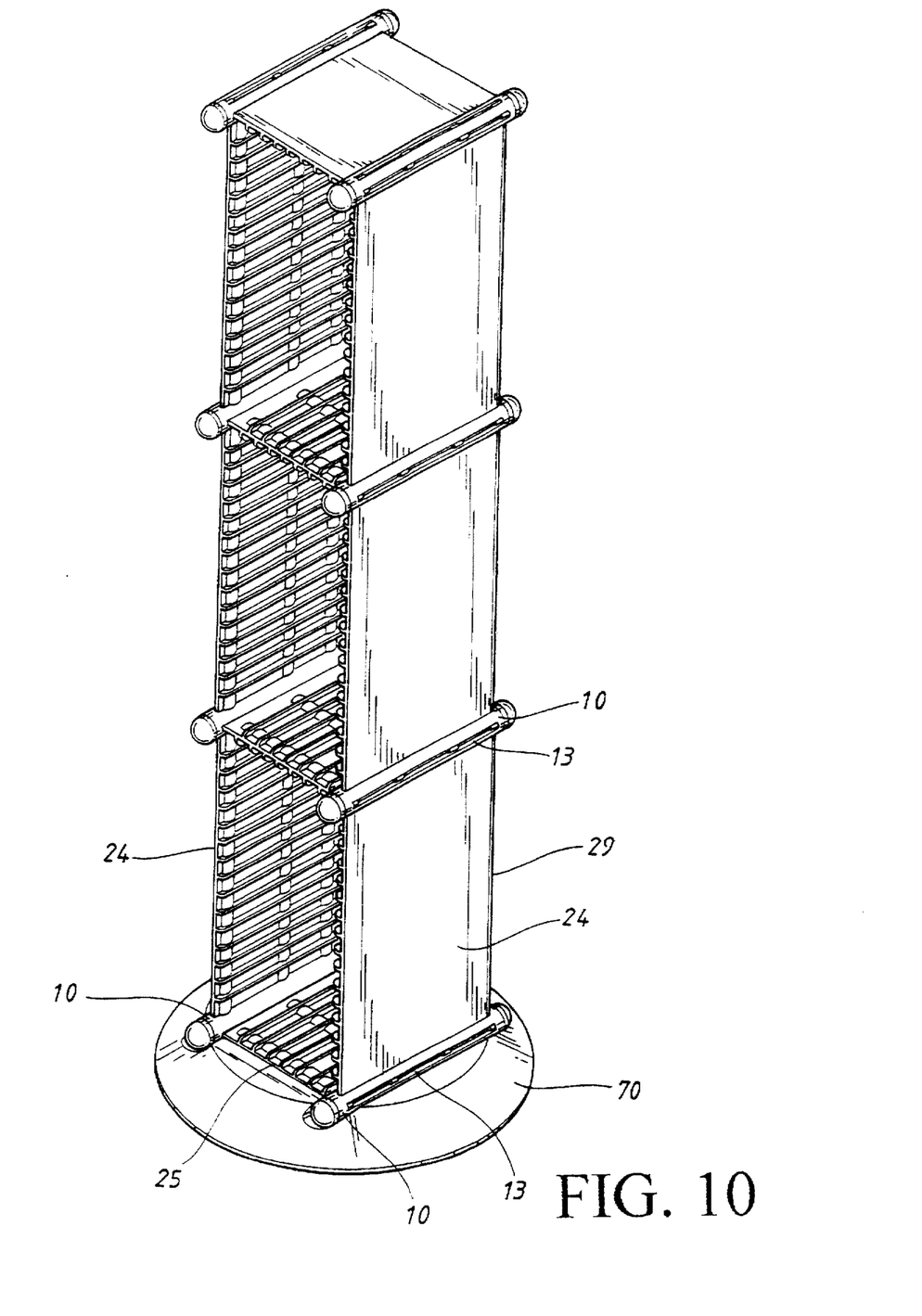
FIG. 10 is a perspective view showing an assembly formed by three racks according to the embodiment of FIG. 6.

Referring to FIGS. 7, 8 and 9, the inner bottom face of the base 70 is disposed with a hollow post 76 composed of multiple spaced arch plates arranged in a circular pattern. The bottom dish 90 is disposed with a central projecting post 91 for rotatably fitting with the hollow post 76 of the base 70. Each arch plate is formed with a resilient hook 78 at the end, while the bottom edge of the projecting post 91 is formed with an outer flange 93 which is hooked by the resilient hooks 78 of the base 70 so as to firmly assemble the base 70 with tie bottom dish 90. In addition, multiple short bosses 92 are disposed on the surface of the bottom dish 90 by equal radial length. The inner bottom face of the base 70 is formed with corresponding annular groove 77, whereby steel balls 80 can be disposed therebetween, permitting the base 70 to smoothly rotate relative to the bottom dish 90. Several slipproof pads 94 are disposed under the bottom of the bottom dish 90 for achieving a slipproof effect during rotation of the rack.

The area of the base can be enlarged to increase the stability of the rack during rotation of the rack. According to the above arrangements, the video/audio medium racks can be stacked or assembled into versatile units to enlarge the capability thereof. The video/audio medium rack includes simple components which can be easily manufactured by injection molding and directly packed with a bag for sale. The components can be easily assembled by a consumer himself/herself. Therefore, the present invention can be more elastically and widely used. Also, in the manufacturing procedure, the assembling step is saved so that the cost is reduced. The present invention is applicable to various situations such as a sale or exhibition site for video/audio medium, domestic storage, library data disk storage, etc.

It is to be understood that the above description and drawings are only used for illustrating one embodiment of the present invention, not intended to limit the scope thereof. Any variation and derivation from the above description and drawings should be included in the scope of the present invention.

What is claimed is:

1. A video/audio medium rack at least comprising four connecting rods, four wall boards and a back board, wherein each connecting rod is a cylindrical body composed of two identical hollow semicylindrical members and two cap members, an inner side of the semicylindrical member being formed with an arch concave having a central engaging slot, an inner edge of the engaging slot being formed with a right angle plane face, two lateral edges of the semicylindrical member being formed with recesses each of which together with the arch concave define a right angle plane face, each end of the semicylindrical member being formed with an annular projection, four knot sections being disposed on the inner side of the semicylindrical member at equal intervals, two of the four knot sections adjacent to one end being disposed with tenons, while the other two knot sections adjacent to the other end being disposed with mortises, two middle knot sections being disposed with hook bodies directed to the same direction, whereby when the two semicylindrical members are assembled, the hook bodies are hooked with each other and the tenons and engaged with the mortises and the recesses together form another engaging slot, the cap member being tightly fitted with the annular projection 15 to form the connecting rod with upper, lower, left and right engaging slots;

the wall boards are rectangular or square board bodies, each lateral side of the wall board being disposed with multiple tenons having engaging blocks on two sides for passing through and engaging with the engaging slot, a rear side of the wall board being disposed with a channel for the back board to insert therein, the wall board being disposed with multiple slide rails perpendicular to the channel, multiple arch guiding ribs being are disposed across the slide rails parallel to the channel;

the back board is a rectangular or square plate body formed with peripheral stopper flange for fitting into the channels of the wall boards, whereby the tenons of the rectangular wall boards and square wall boards are interlacedly engaged in the engaging slots of the four connecting rods.

2. A video/audio medium rack as claimed in claim 1, wherein the wall boards include two lateral rectangular wall boards and an upper and a lower square wall boards.

3. A video/audio medium rack as claimed in claim 1, wherein the wall boards are all square board bodies.

4. A video/audio medium rack as claimed in claim 1, wherein the slide rails are disposed on single side of the wall board.

5. A video/audio medium rack as claimed in claim 1, wherein the slide rails are disposed on both sides of the wall board.

6. A video/audio medium rack as claimed in claim 1, further comprising a base disposed under the bottom of the rack, the surface of the base being formed with a dented face corresponding to the bottom of the rack, the dented face including a central dented section and two lateral rod-like arch dented sections, insertion plates being disposed in the arch dented sections, each insertion plate having two engaging blocks on two sides, whereby when the rack is placed on the upper surface of the base, the insertion plates of the arch dented sections are engaged with the engaging slots of the connecting rods so that the rack can be assembled with the base, the base being rotatably fitted with a bottom dish, whereby the base along with the rack can be rotated relative to the bottom dish.

7. A video/audio medium rack as claimed in claim 6, wherein an inner bottom face of the base is disposed with a hollow post composed of multiple spaced arch plates arranged in a circular pattern, the bottom dish being disposed with a central projecting post for rotatably fitting with the hollow post of the base, each arch plate being formed with a resilient hook at the end, while the bottom edge of the projecting post being formed with an outer flange which is hooked by the resilient hooks of the base so as to firmly assemble the base with the bottom dish, multiple short bosses being disposed on the surface of the bottom dish by equal radial length, the inner bottom face of the base being formed with corresponding annular groove, whereby steel balls can be disposed therebetween, permitting the base to smoothly rotate relative to the bottom dish.

* * * * *